Jan. 25, 1966 W. R. CASTRO 3,231,696

CENTRIFUGAL SWITCH HAVING A PAIR OF SPACED APART PRINTED CIRCUIT CONTACT PLATES

Filed Dec. 20, 1963 2 Sheets-Sheet 1

INVENTOR.
WILLIAM R. CASTRO

BY William R. Nolte
AGENT

INVENTOR.
WILLIAM R. CASTRO
BY William R. Nolte
AGENT

United States Patent Office
3,231,696
Patented Jan. 25, 1966

3,231,696

CENTRIFUGAL SWITCH HAVING A PAIR OF SPACED APART PRINTED CIRCUIT CONTACT PLATES

William R. Castro, Bryn Mawr, Pa., assignor to Burroughs Corporation, Detroit, Mich., a corporation of Michigan Filed Dec. 20, 1963, Ser. No. 332,005
10 Claims. (Cl. 200—80)

This invention relates to centrifugally actuated switches and more particularly to such switches which are adapted for high shock and high spin applications.

One type of centrifugal switch which has previously been employed for such purposes utilizes a rotatable housing having a central cavity therein partially filled with mercury. The cavity is connected with groups of outwardly and upwardly extending passageways located in a manner so that a plurality of electrical contacts are adapted to be in contact with the mercury at certain speeds of rotation and to be out of contact with the mercury at other speeds of rotation. A disadvantage of such an arrangement is that inadvertent electrical connection of contacts can be made accidentally by splash of the mercury due to shock, force, or vibration at other than the prescribed spin about its axis of rotation.

It is an object of this invention, therefore, to provide an improved centrifugally actuated switch which avoids one or more of the disadvantages of the prior art arrangements.

It is another object of this invention to provide an improved centrifugal switch to actuate an electrical circuit upon sudden application of the high spin rate immediately following a high shock load.

In accordance with the invention, printed circuit plate means are mounted to a frame or housing within which are supported a plurality of movable means carrying electrical contact means for engaging circuits on the printed circuit plate means, the movable means are pivotally mounted and are interrelated one to another so that independent movement of one relative to another of such means to actuate the switch means cannot occur. When, however, the switch is rotated in its active condition about its axis of rotation at its prescribed spin rate, the movable means are pivoted outwardly in a manner to open a multiplicity of normally closed circuits and close a plurality of normally open circuits.

For a better understanding of the present invention together with other and further objects thereof, reference is had to the following description taken in connection with the accompanying drawings and its scope will be pointed out in the appended claims.

Figures 1, 2:
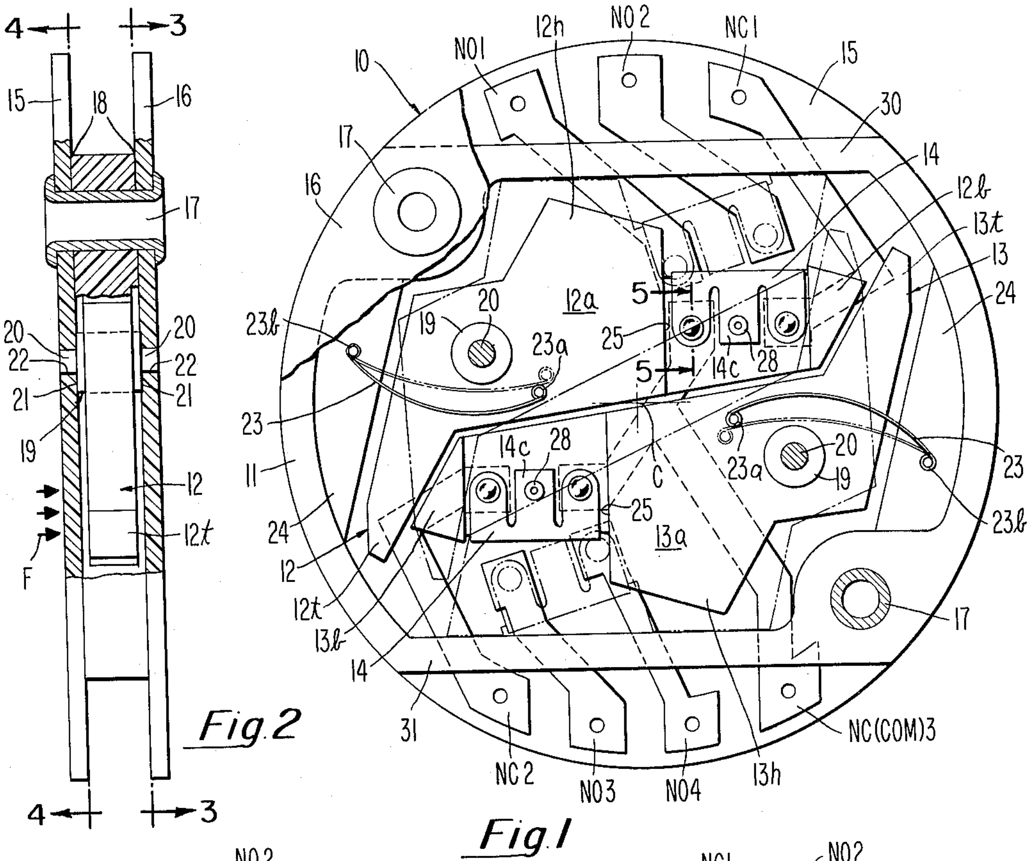
FIG. 1 is an elevational view of a complete centrifugal switch embodying the present invention with one of the printed circuit cover plates broken away.
FIG. 2 is an end elevational view partially in section of the switch shown in FIG. 1.

Referring to FIGS. 1 and 2 of the drawing, there is shown a centrifugal switch 10 embodying the invention. The switch comprises a ring-like housing or frame 11 encircling a pair of contact wiper arms 12, 13 each of which carries multiple contact wiper element 14 at its extremity. A pair of printed circuit plates 15, 16 of circular form are affixed to opposite sides of frame 11, and are suitably secured in place as by eyelets or rivets 17, and a layer of electrically insulative cement 18 connecting the adjoining surfaces of the three elements. The two contact wiper arms 12, 13 also of insulative material are each mounted for rotation about a pivot post 19, the opposite ends 20 thereof being of reduced diameter and being received as by press-fitting into holes 22 of the opposed printed circuit plates 15, 16. The opposite ends 20 of the pivot posts define shoulder surfaces 21 which engage the inner surfaces of the plates and prevent deflection of the plates when the switch is subjected to high G forces in the direction of the arrow indicated a F in FIGURE 2. The thickness of the wiper arms 12, 13 is less than the distance between the opposed shoulder surfaces 21 of the pivot post to accommodate a return spring 23 and to provide operating clearances. Each return spring 23 is connected at one of its ends as at 23*a* to its associated contact wiper arm and at its other end 23*b* to recessed shelf portion 24 of frame 11, and is effective to urge its associated wiper arm to its normal inactive condition.

Figure 3:
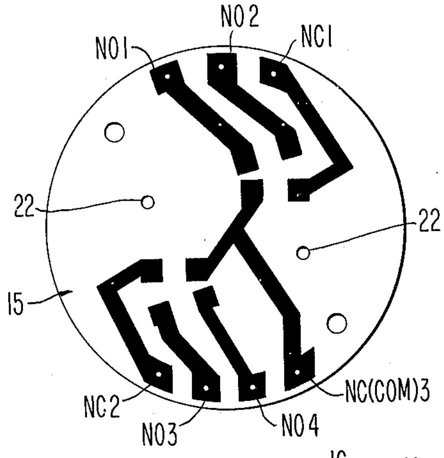
FIG. 3 is a view taken along the line 3—3 of FIG. 2.
Figure 4:
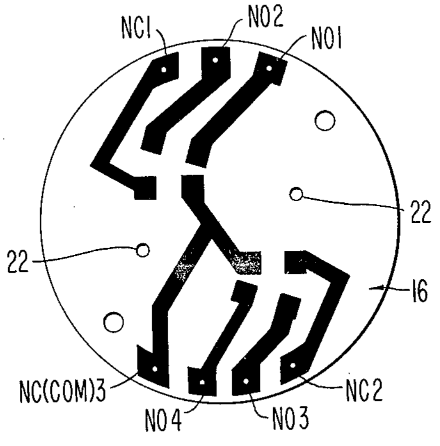
FIG. 4 is a view taken along the line 4—4 of FIG. 2.

Referring now to FIGS. 3 and 4, it is observed that printed circuit contact boards 15 and 16 are also of insulative material and each includes a multiplicity of printed circuits on one face thereof, which face is the mirror image of the circuitry contained on the inner face of the board opposite thereto. Specifically, the upper half portion of each board includes electrically conductive circuit paths NO1, NO2, and NC1, while the lower half portion of each board includes paths NC2, NO3, NO4 and NC(COM)3. The circuit paths may be formed flush with the sheet of insulating material by well known printed circuit techniques or other means.

As seen in FIG. 1, the contact wiper arms 12, 13 are shown in their retracted inactive position and each is of a generally L-shaped configuration and having their respective arm portions 12*a*, 13*a* aligned and in facing relationship. More specifically, arm portion 12*a* of upper contact wiper arm 12 is shown extending to the right of pivot shaft 19 and is generally parallel to and in contact with arm portion 13*a* which extends leftwardly from its pivot shaft 19. In addition, the tail portion 13T of wiper arm 13, which is to the right of and extends upwardly from its pivot 19, is in aligned facing engagement with the extremity or nose portion 12*b* of arm 12. In a similar manner the tail portion 12T of wiper 12, which extends downwardly and lies to the left of its pivot post 19, is in aligned facing engagement with the tip or nose portion 13*b* of arm 13. It can readily be seen that action of either arm by itself as a result of shock forces in any direction is prevented by the nesting of the nose of one arm in the tail of the other. Any force other than a centrifugal one about the normal center of rotation of the switch will tend to move the arms in the same direction. If this happens the nose of one will effectively block the tail of the other so that neither can move an amount sufficient to cause a malfunction.

Figure 5:
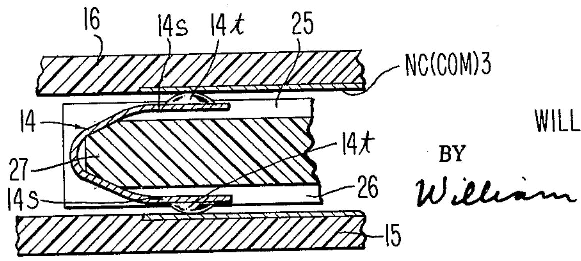
FIG. 5 is a sectional view taken along line 5—5 of FIG. 1.

Considering the wiper arms 12, 13, in greater detail, each includes recesses 25, 26 within top and bottom surfaces of its arm portion 12*a*, 13*a* to accommodate its associated contact, a bifurcated multiple contact wiper element 14. Recess 26 on the lower surface thereby is indicated in FIGURE 5. As best seen in FIG. 5, the multiple wiper element 14 which may be formed of a blank of electrically conductive material is generally V-shaped to embrace the tapered edge 27 of the wiper arm and is formed with centrally located tab portions 14*c* which engage opposite surfaces of the wiper arm and are suitably fastened thereto as at 28. The wiper further includes upper and lower spring fingers 14*s* located on opposite sides of tabs 14*c* which engage circuit paths on upper and lower plates 15 and 16 under spring pressure. The outer extremities of the spring fingers include raised contact points 14*t* which may be formed by dimpling.

In the static condition of the switch, or at a spin rate below that at which activation of the switch is obtained from one state to another, the two contact arms 12, 13 are held together at their innermost positions in the above described nested relationship one to the other by virtue of the forces applied by the aforementioned contact arm return springs 23. In this position the contact wipers 14 are of sufficient width to bridge and press against the inner surfaces of both plates. Contact wiper 14 thus connects normally closed contact NC1 to NC(COM)3, on both upper and lower contact plates 15, 16. The wipers thus provide bridging interconnecting action between the plates as each contact wiper is common to both plates, and corresponding circuit paths on both plates may be wired together.

In operation and prior to actuation of the electrical circuitry of the switch due to sudden application of a high spin rate about its center or axis of rotation indicated at C in FIGURE 1, the switch may be first subjected to high shock loads uniformly distributed over the entire area of plate 15 in the direction of the arrow F indicated in FIGURE 2 and generally of the magnitude of 30,000 G's. This force is in a direction perpendicular to the plate 15 and is effective to cause all the remaining parts under such loads to tend to be forced against the internal surface of plate 15. By forming the contact arms of reduced thickness at recesses 25, 26 where the V-shaped spring wipers 14 are mounted, the latter will be protected in the step between the portion of the arm of reduced cross-section and the full thickness of the arm as the same is pressed solidly against plate 15 due to such force. It is thus seen that the wiper contacts 14 cannot be crushed between the wiper arms and the printed circuit plate 15 by the application of such perpendicular forces of great magnitude. It should also be noted that the return springs 23 received in recess or shelf portions 24 of frame 11 and the space between the arm and the upper disc 16 are likewise not squeezed between the wiper arm and outer plate 16 when the shock forces are applied as shown.

In the active condition of the switch at a spin rate which is equal to or is higher than its activating speed, the wiper arms 12 and 13 are caused to rotate outwardly one from another on their pivot shafts 19 until they are stopped by engagement of their protruding heel portions 12*h*, 13*h* respectively, with upper and lower horizontally disposed portions 30, 31 of frame 11. In this position of the contact wiper arms 12, 13 shown in dotted lines, FIG. 1 the bifurcated wiper element 14 of arm 12 connects normally open circuit paths NO1 and NO2 and the wiper element of arm 13 connects normally open circuits paths NO3 to NO4 of both the top and bottom plates. It should be observed furthermore that in this condition of very high spin rate the centrifugal forces acting upon the V-shaped wiper contacts is in a direction to aid the inherent spring forces of the spring arms 14*s*, to cause the same to grip the circuitry with increased contact pressure. This follows because rotation of the switch about its axis applies centrifugal forces on the spring fingers tending to deflect them about the base of the V or the tapered edge 27. Upon reduction of the spin rate of the switch about its normal axis of rotation to or below the speed of outward actuation of the arms the switch automatically resets itself, in that the wiper arms are restored to their normal position by their respective return springs 23. In this condition the normally open contacts NO1, NO2, NO3, NO4 are once again opened while the normally closed contacts NC1 to NC(COM)3 and NC2 to NC(COM)3 are closed.

Figure 7:
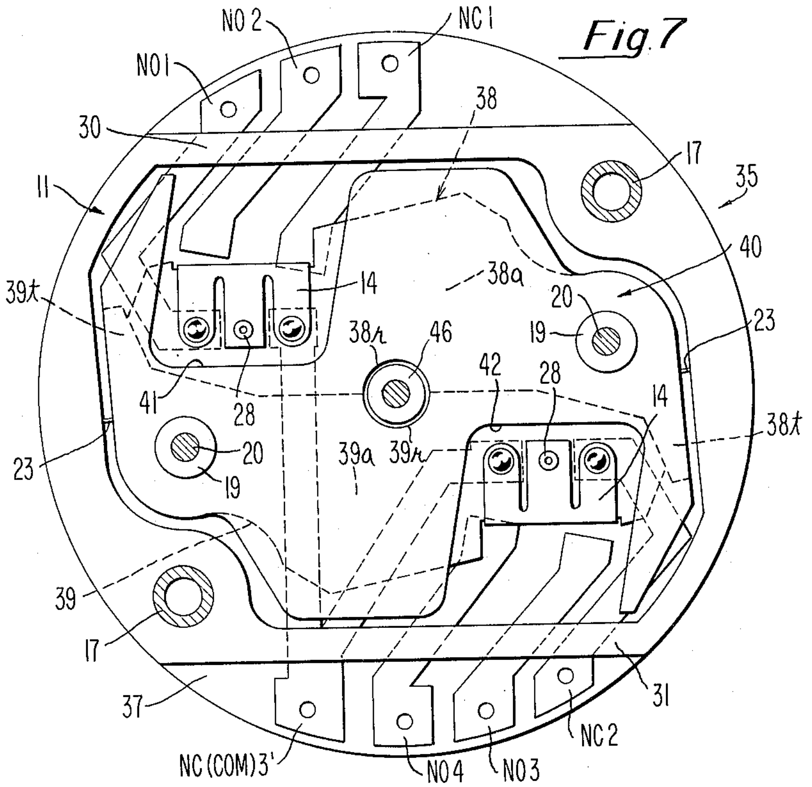
FIG. 7 is a view taken along the line 7—7 of FIG 6.
Figure 6:
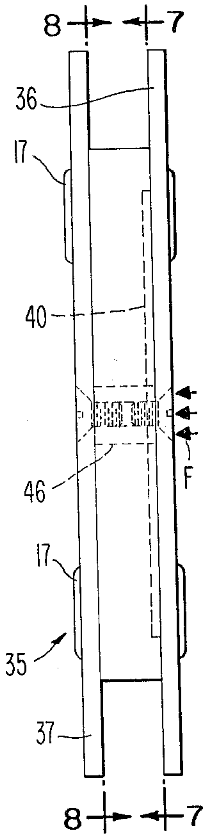
FIG. 6 is an end view of a modified form of the invention.
Figure 8:
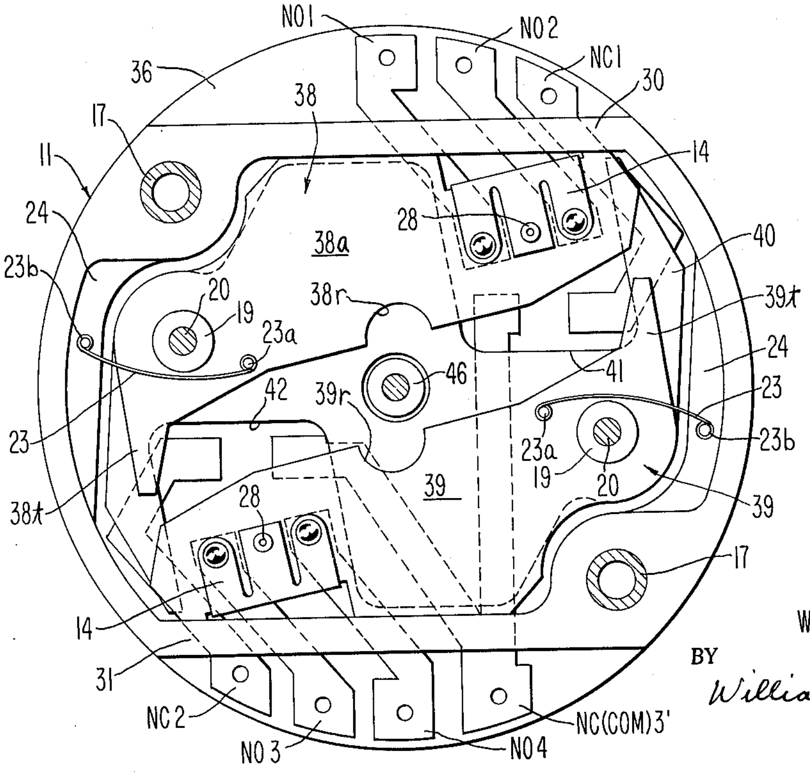
FIG. 8 is a view taken along the line 8—8 of FIG. 6.

A modification of the centrifugal switch of FIGURES 1–5 embodying this invention is shown in FIGURES 6 to 8 inclusive. The modified form of the switch 35 is similar to that of FIGURES 1 to 5 and corresponding elements are indicated by identical reference numerals.

In FIGURES 6 and 7 the switch comprises a pair of printed circuit plates 36 and 37 secured to opposite sides of the ring-like housing 11 by rivets 17 and cement 18. The housing encircles a pair of wiper arms 38, 39 and each is mounted on pivot post 19 and likewise carries a multiple contact wiper element 14 at its other end. The wiper arms are not recessed adjacent the wiper contacts 14 as in the prior modification. Return springs 23 maintain the wiper arms in the nested relationship one to the other.

More specifically, as shown in FIGURE 7, arm 38 includes an elongated central portion 38*a* and a tail portion 38*t* while arm 39 includes an elongated arm portion 39*a* and tail portion 39*t*. In the normally inoperative condition of the switch as seen in FIGURE 7, the tail portion 38*t* is in facing engagement with the extremity of arm portion 38*a*. As in the prior described modification any force other than a centrifugal one about the normal center of rotation will cause both arms to tend to move in the same direction. If this happens the extremity of arm portion 39*a* for example, will block the tail 38*t* of upper arm 38. In like manner the extremity of arm 38*a* will block the tail 39*t* of arm 39*a*.

A spacer plate 40 including cutout portions 41, 42 is interposed between the outer printed circuit plate 36 and the aforementioned wiper arms, which spacer plate and recesses serve to prevent spring fingers of the multiple contact wiper elements from being crushed between the wiper arms 38, 39 and outer plate 36 when the switch is subjected to extremely high G forces in the direction of the arrow F in FIGURE 6. The spacer plate 40 may furthermore be of electrically insulative material, while the wiper arms 38, 39 of the instant modification, may be of an electrically conductive material such as a metal, which is relatively heavy to enable the same to rotate outwardly one from the other more readily. The outward movement of the wiper arms 38, 39 is opposed by the forces inherent in the return springs 23 and by the frictional drag forces of the spring fingers of the wiper contacts 14 with the printed circuit plates. The ratio of these forces to the weight of the wiper arms is greater in the modification shown in FIGURES 1 to 5, and smaller in the modification shown in FIGURES 6 through 8.

Each of the wiper arms 38, 39 include semi-circular recesses 38*r*, 39*r*, while spacer plate 40 includes a centrally located hole 45 to accommodate spacer element 46. The latter element is secured to the inner faces of the printed circuit plates 36, 38 by screws 47. When the switch is subjected to a high shock load in the direction of arrow F, the spacer element 46 precludes collapse of printed circuit plate 37 relative to opposed circuit plate 36. In a similar manner the spacer plate 40 protects the multiple wiper contact 14 in recesses 41, 42 from damage due to high compression forces. It will be noted that the circuit path NC(COM)3′ is of generally V form to straddle the centrally located spacer 46 but its function remains the same as NC(COM)3 of FIGURES 1, 3 and 4.

Although the above-described embodiments disclose the invention as applied to an airborne centrifugally activated switch, it is to be understood that the invention may also be employed in connection with conventional types of centrifugally actuated switches which may be subjected to high vibration or shock loads. In the forms of the switch described above, it has been shown that the same cannot be actuated accidentally by any form of shock, force or vibration other than the prescribed spin about its normal axis of rotation. Moreover, once the normally open contacts have been closed, they remain closed under the effects of high rotational speed and vibration and that upon reduction of spin rate to or below the speed of actuation, the switch automatically resets itself by opening the normally open contacts and closing the normally closed contacts.

While there have been described what are at present considered to be the preferred embodiments of this invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A centrifugally responsive switch comprising a frame, first and second contact plates each having electrically conductive circuit paths thereon, a pair of contact arms responsive to centrifugal motion and each pivoted between said opposed contact plates and including means providing a nesting relationship one to the other for preventing independent motion of one relative to the other in a static state of operation thereof, electrical contact means engaging said first and second contact plates and secured to said contact arms for conducting engagement with said selected ones of said conductive circuit paths on said opposed plates in the inactive state of said switch and for engagement with other of said circuit paths in the active state of operation of said switch, whereby upon accidental movement of any kind of said switch, substantial movement of one contact arm is inhibited by the other arm, but upon said switching device being actuated to a predetermined spin rate about its axis of rotation, each said contact arm is free to separate from its nested relationship with the other of said contact arms to engage said other of said conductive circuit paths on said contact plates.

2. A centrifugally responsive switch device comprising in combination, a plurality of printed circuit means spaced one from another with the conductive paths on adjacent boards disposed in facing relationship, a plurality of contact members responsive to centrifugal motion and each including an elongated body portion and an appendage disposed at an angle thereto, said members in an inoperative state thereof being in nested relation one to another and each pivoted at the intersection of its body portion and appendage for rotation between adjacent plates, the appendage of one member in said inoperative state of said device being normally transverse to the body portion of another member such that any movement imparted to said switch effective to impart movement to said one member causes the appendage to said one member to impart a force on the body portion of the other member which force is resisted by the pivot of said other member.

3. A centrifugally responsive switch device comprising in combination, a plurality of printed circuit means spaced one from another with the conductive paths on adjacent boards disposed in facing relationship, a plurality of contact members responsive to centrifugal motion and each including an elongated body portion and an appendage disposed at an angle thereto, said members in an inoperative state thereof being in nested relation one to another and each pivoted at the intersection of its body portion and appendage for rotation between adjacent plates, said members in the inoperative state being so disposed that the appendage of one member lies adjacent the body portion of the other, and such that an inadvertant force applied to said switch device effective to pivot one of said members outwardly relative to the other member is resisted by blocking engagement of the appendage of said other member.

4. A centrifugally responsive switch comprising a frame, a pair of contact plates each having first and second groups of electrically conductive circuit paths thereon and disposed so that the conductive circuit paths on one of said plates are in opposed facing relationship to the circuit paths of said other plate, a pair of contact arms responsive to centrifugal motion and each pivoted between said opposed contact plates and including means providing a nesting relationship one to the other for preventing independent motion of one relative to the other in a static state of operation thereof, electrical contact means engaging said pair of plates and secured to said contact arms for conducting engagement with a first group of said conductive circuit paths on said opposed plates in the inactive state of operation of said switch and into contact with a second group of electrical contacts in the active condition of said switch, whereby upon accidental movement of any kind of said switch substantial movement of one contact arm is inhibited by the other arm, but upon said switching device being actuated to a predetermined spin rate about its axis of rotation each said contact arm is free to separate from its nested relationship with the other of said contact arms to cause the contact means to engage the second group of circuit paths, and bias means affixed to each said contact arms for restoring said contact arms to their initial nesting relationship upon the spin rate of rotation said switch dropping below a predetermined amount to cause said contact means to engage said first group of circuit paths.

5. A centrifugally responsive switch comprising a frame, first and second contact plates each having electrically conductive circuit paths thereon and disposed so that the conductive circuit paths on one of said plates is in opposed facing relationship to the circuitry paths of the other plate, a pair of contact arms responsive to centrifugal motion and each pivoted between said opposed contact plates and including means providing a nesting relationship one to the other for preventing independent motion of one relative to the other in a static state of operation thereof, multiple electrical bifurcated contact means engaging said first and second contact plates and secured to said contact arms for conducting engagement with said conductive circuit paths on said opposed plates, whereby upon accidental movement of any kind of said switch, substantial movement of one contact arm is inhibited by the other arm, but upon said switching device being actuated to a predetermined spin rate about its axis of rotation each said contact arm is free to separate from its nested relationship with the other of said contact arms and to open a multiplicity of normally closed circuit paths and to close a multiplicity of normally open circuit paths.

6. A centrifugally responsive switch comprising in combination a frame, first and second contact plates each having a plurality of electrically conductive circuit paths thereon and disposed so that the conductive circuit paths on one of said plates are in opposed facing relationship to the circuitry paths of the other plate, a pair of contact arms responsive to centrifugal motion and each pivoted between said opposed contact plates and including means providing a nesting relationship one to the other for preventing independent motion of one relative to the other in a normally inactive state of operation of said switch, said contact arms including recess portions, electrical contact means engaging said first and second contact plates and mounted on said contact arms within said recess portions for conducting engagement with said conductive paths on said opposed plates, whereby upon said switch being subject to high shock forces in a direction normal to said printed circuit plates said contact wipers are protected within the recessed portions on said contact arms, but upon said switching device being actuated to a prescribed spin rate about its normal axis of rotation each said contact arm is free to separate from its nested relationship with the other of said contact arms.

7. A centrifugally responsive switch comprising in combination a frame, first and second contact plates each having a plurality of electrically conductive circuit paths thereon and disposed so that the conductive circuit paths on one of said plates are in opposed facing relationship to the circuitry paths of the other plate, a pair of contact arms responsive to centrifugal motion and each pivoted between said opposed contact plates and including means providing a nesting relationship one to the other for preventing independent motion of one relative to the other in a normally inactive state of operation of said switch, multiple electrical contact means engaging said first and second contact plates and mounted on each said contact arm for conducting engagement with, and interconnection of, predetermined ones of said conductive paths on said opposed plates to form a circuit through each of said contact arms in the normally inactive condition of said switch, whereby upon said switching device being actuated to a prescribed spin rate about its normal axis of rotation said contact means are caused to separate from their nested position so that the multiple contact means are disengaged from said ones of said circuit paths and into engagement with others of said circuit paths on said plates.

8. A centrifugally responsive switch comprising in combination a frame, a plurality of aligned contact plates disposed in spaced relationship with adjacent plates thereof having facing electrically conductive circuit paths thereon, a plurality of contact arms responsive to centrifugal motion and each pivoted between said opposed adjacent contact plates and including means providing a nesting relationship one to the other for preventing independent motion of one relative to the other in a normally inactive state of operation of said switch, multiple electrical contact means engaging said plurality of contact plates and mounted on said contact arm for conducting engagement with, and interconnection of, predetermined ones of said conductive paths on said opposed plates to form a circuit through each of said contact arms in the normally inactive condition of said switch, whereby upon said switching device being actuated to a prescribed spin rate about its normal axis of rotation said contact arms are caused to separate from their nested position so that the multiple contact means are disengaged from said ones of said circuit paths and into engagement with other of said circuit paths on said adjacent plates.

9. A centrifugally responsive switch comprising in combination, a frame, a plurality of contact plates each having a plurality of electrically conductive circuit paths thereon and disposed so that the conductive circuit paths on adjacent plates are in opposed facing relationship, a plurality of contact arms responsive to centrifugal motion and pivoted between said opposed adjacent contact plates and including means providing a nesting relationship one to the other for preventing independent motion of one relative to the other in a normally inactive state of operation of said switch, multiple electrical contact means engaging said plurality of contact plates and mounted on each of said contact arm for conducting engagement with, and interconnection of, predetermined ones of said conductive paths on said opposed adjacent plates to form a circuit through each of said contact arms in the normally inactive condition of said switch, each said multiple contact means being bifurcated in form and including a plurality of individual spring arms engageable with selected circuit paths, whereby upon said switching device being actuated to a prescribed spin rate about its normal axis of rotation said contact arms are caused to separate from their nested position and said spring arms are caused to grip said circuit paths with increased contact pressure under the action of centrifugal force thereon.

10. A centrifugally responsive switch comprising in combination, a frame, a plurality of contact plates each having a plurality of electrically conductive circuit paths thereon and disposed so that the conductive circuit paths on one of said plates are in opposed facing relationship to the circuitry paths of the other plate, a plurality of contact arms responsive to centrifugal motion and each pivoted between said opposed contact plates and including means providing a nesting relationship one to the other for preventing independent motion of one relative to the other in a normally inactive state of operation of said switch, multiple electrical contact means engaging said plurality of contact plates and mounted on each said contact arm for conducting engagement with, and interconnection of, predetermined ones of said conductive paths on said opposed plates to form a circuit through each of said contact arms in the normally inactive condition of said switch and movable into engagement with other of said conductive paths in the active condition of said switch, each said multiple contact means being bifurcated in form and including a plurality of individual spring arms engageable with selected circuit paths, spacer means disposed between said arms and one of said contact plates, said spaced means including cutout portions to permit travel of said multiple electrical contact means, whereby upon said switch being actuated to a prescribed spin rate about its normal axis of rotation corresponding to the active condition of said switch said contact arms are caused to separate from their nested position and said spring arms are caused to travel within the margins of the cutout portions of said spacer means and to engage said other conductive circuit paths.

No references cited.

BERNARD A. GILHEANY, *Primary Examiner.*